(No Model.)
G. W. HARRISON.
HORSE DETACHER.
No. 429,904. Patented June 10, 1890.
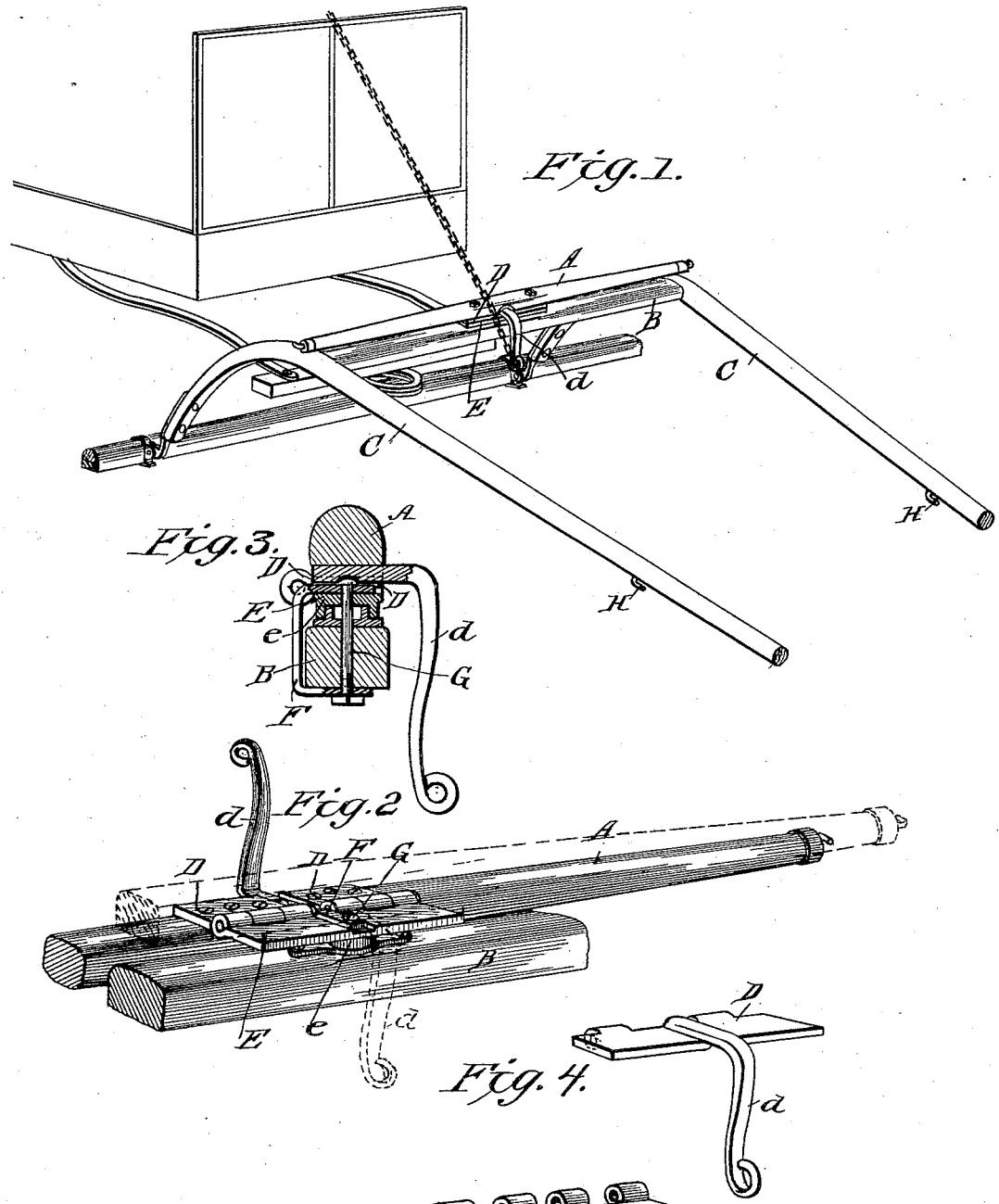
WITNESSES:
Fred G. Dietrich
P. B. Turpin
INVENTOR:
G. W. Harrison
BY Munn & Co.
ATTORNEYS

UNITED STATES PATENT OFFICE.

GEORGE W. HARRISON, OF SANTA ANNA, TEXAS, ASSIGNOR OF TWO-THIRDS TO THOMAS W. DICKSON AND HIGDON S. TARVER, OF SAME PLACE.

HORSE-DETACHER.

SPECIFICATION forming part of Letters Patent No. 429,904, dated June 10, 1890.

Application filed January 16, 1890. Serial No. 337,157. (No model.)

*To all whom it may concern:*

Be it known that I, GEORGE W. HARRISON, of Santa Anna, in the county of Coleman and State of Texas, have invented a new and useful Improvement in Horse-Detachers, of which the following is a specification.

My invention is an improvement in horse-detachers, by which, in case of a runaway, the horse or team may be quickly released from the whiffletree by turning the latter; and the invention consists in certain novel constructions and combinations of parts, as will be hereinafter described and claimed.

In the drawings, Figure 1 shows the invention in position in connection with part of a carriage. Fig. 2 is a perspective view of the invention with the devices in full lines in position as when the horse is detached or released. Fig. 3 is a cross-sectional view of the invention, and Fig. 4 shows the upper and lower plates in detail and detached.

My invention is shown in its application to a singletree, but manifestly it might be used in connection with the singletrees on an evener-bar or in connection with the evener-bar of a doubletree, and in referring to the turning portion of my invention I shall designate the turning portion as the "whiffletree," intending to include under such term both the singletree and the doubletree, as it will be obvious that the invention is applicable to both single and double teams.

In the construction shown, the whiffletree A is supported on the shaft-bar B, which connects the shafts or thills C, such bar B constituting the support for the whiffletree. At its ends the whiffletree shown is provided with hooks, which both open in the same direction, and when the whiffletree is in its normal position open or face to the rear, as shown, so as to secure the traces. It will now be seen that if the whiffletree be given a half-turn the hooks will be reversed and open forward and release the trace. To this end I hinge the whiffletree at its rear edge so that it may be turned backward to reverse the hooks. This hinging of the tree at its rear edge is important, inasmuch as, by reason of the arrangement of the hinge, the tendency of the draft is to keep the tree in proper position to hold the trace in engagement with its hooks.

In effecting the hinge of the tree I prefer to use the construction shown, which consists of the hinge or connection formed of the upper plate D and lower plate E, such plates being connected at their rear edges by hinge-joints, and having at such edge an opening for the clip F, which braces the parts in place. On its under side the plate E has a tubular projection $e$, which encircles the pivot-bolt G and forms a turn-table-like portion.

The plate D is formed with an arm or lever $d$, which extends up in front of the whiffletree and into the carriage or wagon in convenient reach of the driver. Now by drawing on this cord or chain the whiffletree will be turned and the traces released.

In connection with my before-described improvements I prefer to arrange the hooks H for the holdback-straps to open forward, as shown, so that when the traces are released and the horse moves forward the holdback-straps will also be released and the horse can move forward out of the shafts.

It will be seen that the connection constructed as described can be manufactured and put on the market and can be applied by a wheelwright or the owner of the carriage to the whiffletree and support.

Having thus described my invention, what I claim as new is—

1. The combination, substantially as hereinbefore described, of the whiffletree-support and the whiffletree hinged at its rear end thereto, whereby the draft on said whiffletree will tend to hold the same in normal position, and whereby such whiffletree may be turned forcibly backward to reverse its trace-hooks or the like and release the traces, substantially as set forth.

2. The combination of the whiffletree-support, the whiffletree, the hinge connecting such parts having its upper and lower plates secured, respectively, to the whiffletree and its support and jointed at their rear edges, and the arm or lever extended forward from the upper plate, whereby upward draft on said arm or lever will turn the whiffletree backward from its normal position to release the traces, substantially as set forth.

3. In a horse-detacher and as a new article of manufacture, a connection having an upper and a lower plate hinged together at their rear edges, the upper plate being formed with an arm or lever extended forward and bent downward, all substantially as and for the purposes set forth.

4. In a horse-detacher, the combination of the bar or support, the whiffletree having the end hooks, the connection formed of upper and lower plates united by a hinge-joint, the hinge being at the rear edge of the whiffletree, whereby the whiffletree may be turned backward to free the traces from the hooks, the said hooks being arranged to open rearwardly toward the hinge-joint when the whiffletree is in its normal position with the hinge-connection closed, all substantially as and for the purposes set forth.

GEORGE W. HARRISON.

Witnesses:
H. D. WALKER,
W. W. McCUTCHEN.